United States Patent [19]

Lee

[11] Patent Number: 5,383,072

[45] Date of Patent: Jan. 17, 1995

[54] DOOR LOCK APPARATUS FOR USE IN A TAPE RECORDER

[75] Inventor: Chang-woo Lee, Suwon, Rep. of Korea

[73] Assignee: Samsung Electronics Co., Ltd., Kyungki, Rep. of Korea

[21] Appl. No.: 111,502

[22] Filed: Aug. 25, 1993

[51] Int. Cl.$^6$ .............................................. G11B 5/008
[52] U.S. Cl. ................................................ 360/96.5
[58] Field of Search ......................... 360/85, 96.5, 96.6

[56] References Cited

U.S. PATENT DOCUMENTS 5,196,972  3/1993  Matsumaru et al. ............... 360/96.5

Primary Examiner—A. J. Heinz

Attorney, Agent, or Firm—Sughrue, Mion, Zinn, Macpeak & Seas

[57] ABSTRACT

A door lock apparatus for use in a tape recorder wherein the door can be opened only via tape cassette insertion. The door lock apparatus is located in the lower portion of the cassette insertion hole, and includes a tape cassette guide, installed at a lower end of the insertion hole, which guides the tape cassette by slidingly contacting against the lower surface thereof, and a door locking mechanism installed on the tape cassette guide, to block or release the rotation of the door when rotated, thereby preventing foreign matter from inadvertently being placed inside the tape recorder.

3 Claims, 5 Drawing Sheets

FIG. 5
FIG. 6
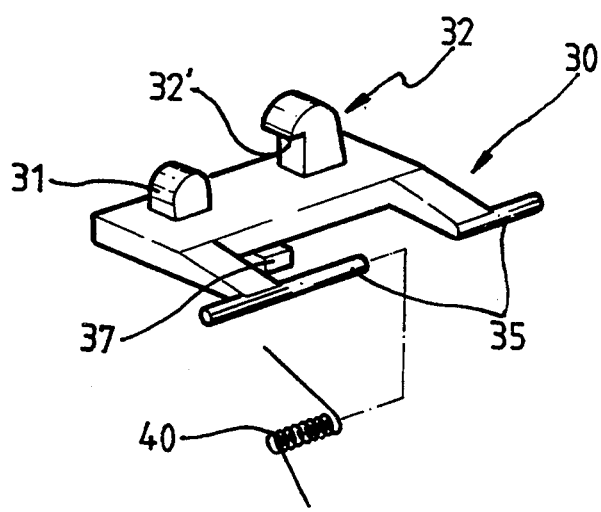
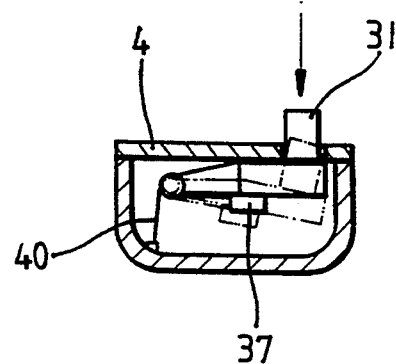
FIG. 7A  FIG. 7B  FIG. 7C
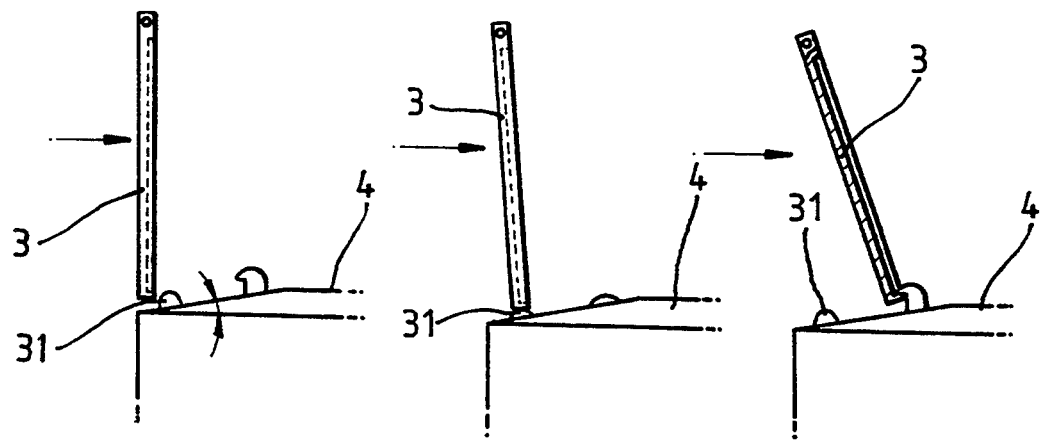

DOOR LOCK APPARATUS FOR USE IN A TAPE RECORDER

BACKGROUND OF THE INVENTION

The present invention relates to a door lock apparatus for use in a tape recorder, and more particularly to an improved door lock apparatus in which the door is openable only by tape cassette insertion and not by casual hand operation.

FIG. 1 shows a conventional door opening and closing device for use in a tape recorder. In FIG. 1, a side view of a tape cassette insertion hole for use in the tape recorder adopting a front loading method, is extracted and shown. An insertion hole 25 is formed on a front portion of a housing 20 and enables the insertion of a tape cassette 24 into the device. A door 23 is rotatably connected to an upper portion of the insertion hole 25 via a hinge 22. A torsion spring 21 is connected to hinge 22, so that door 23 rotates elastically.

In such a conventional door opening and closing apparatus as described above, tape cassette 24 is pushed and thus inserted into the apparatus, after coming into contact with the door 23. Here, the door 23 overcomes the elastic force of torsion spring 21, and rotates inwardly. Immediately after the tape cassette 24 passes beyond the door 23, so as to disengage contact therewith (i.e., after the insertion of tape cassette 24 has been completed), the door rotates forward again and is quickly closed by the restoring force of torsion spring 21.

Also, in such a door opening and closing apparatus for use in a front-loading tape recorder, since the door can be readily opened with ease (e.g., by children), foreign objects can be inadvertently placed in the apparatus.

SUMMARY OF THE INVENTION

Therefore, to solve the above problems, it is an object of the present invention to provide a door lock apparatus for use in a tape recorder in which the door will resist being opened manually or by force, that is, so that children cannot open the door easily.

To accomplish the above object of the present invention, there is provided a door lock apparatus for use in a tape recorder in which a door is rotatably installed in an insertion hole, through which a tape cassette is inserted, so as to open and close the insertion hole, said door lock apparatus comprising:
- a tape cassette guide, installed at a lower end of the insertion hole, which guides the tape cassette by slidingly contacting against a lower surface of the tape cassette; and
- door locking means, installed on the tape cassette guide, which blocks or releases the rotation of the door when the door rotates.

BRIEF DESCRIPTION OF THE DRAWINGS

The above object and other advantages of the present invention will become more apparent by describing in detail a preferred embodiment of the present invention with reference to the attached drawings in which:

FIG. 5 is a perspective view of a locking means in a door lock apparatus according to the present invention;

FIG. 6 shows an operational state of the locking means in a door lock apparatus according to the present invention;

FIGS. 7A through 7C schematically show a door lock operation by which the door opening is attempted without using a tape cassette;

DETAILED DESCRIPTION OF THE INVENTION

A preferred embodiment of the present invention will be described in more detail below, with reference to the accompanying drawings.

Figure 1:
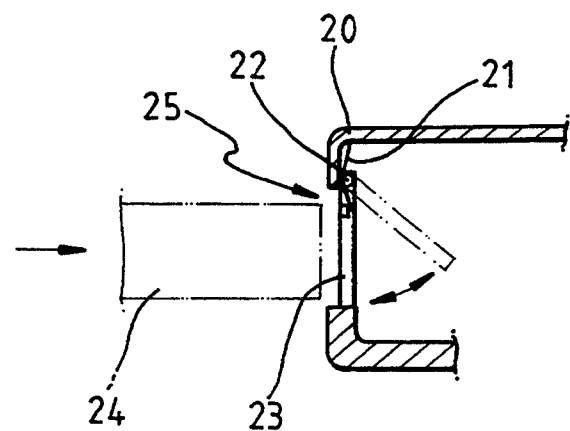
FIG. 1 schematically shows a conventional door opening and closing apparatus.
Figure 2:
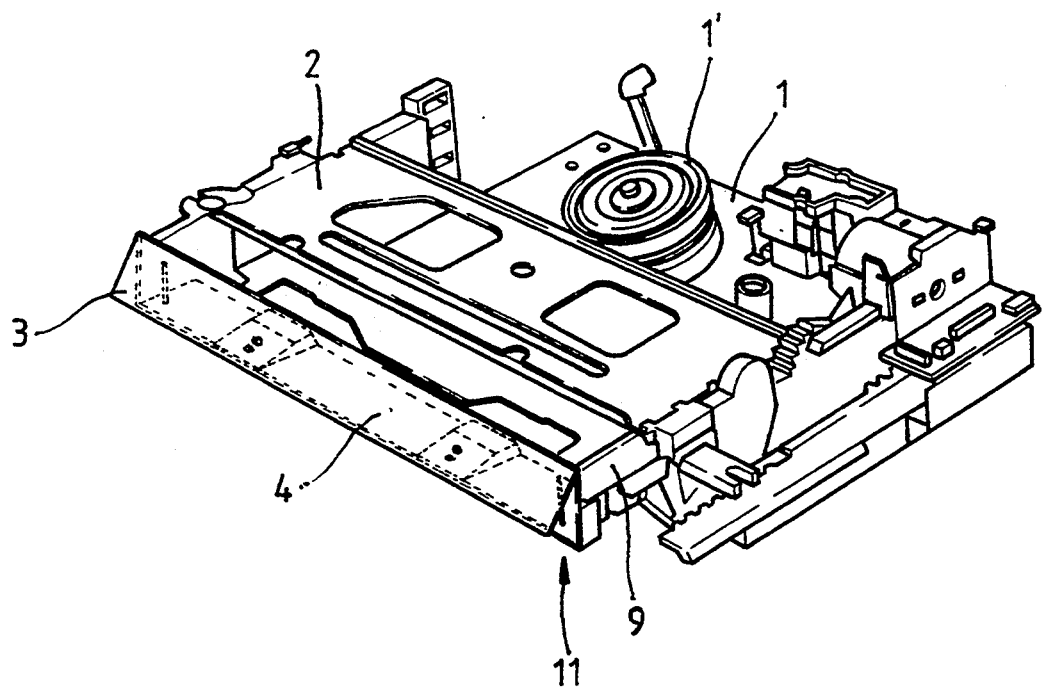
FIG. 2 schematically shows an installation state of a door lock apparatus according to the present invention.

Referring to FIG. 2, included in a tape recorder are a deck 1 on which is installed a guide mechanism for guiding a tape cassette and a rotary magnetic head drum 1', etc., a holder 2 for holding the tape cassette and loading the same into the apparatus, and a housing 9 for supporting the deck 1 and holder 2. A tape cassette insertion hole 11 is formed in the front surface of housing 9, through which the mounting of a tape cassette onto holder 2 is permitted. A door 3 is rotatably hinge-connected to an upper end of insertion hole 11.

Figure 3:
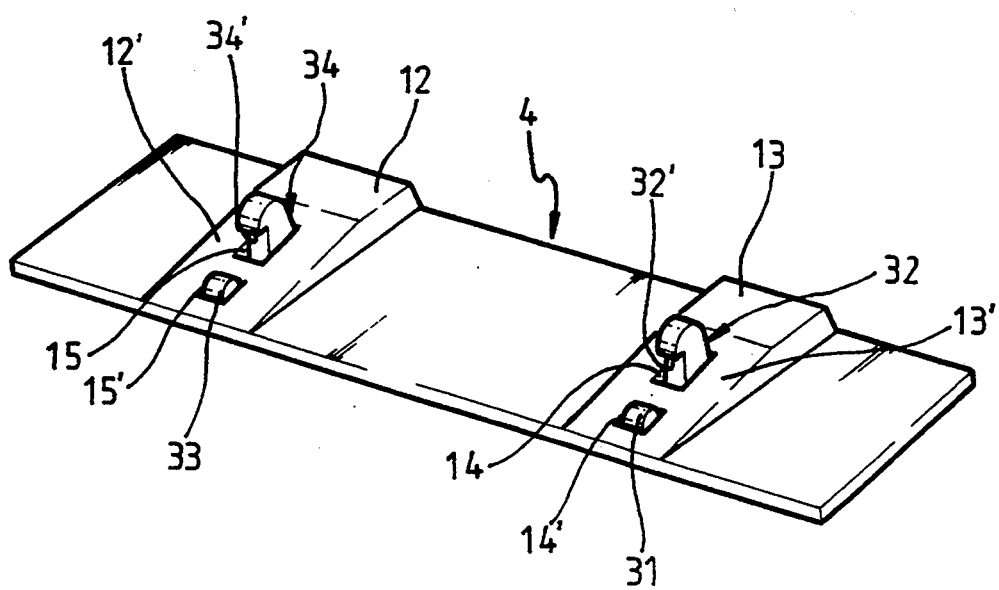
FIG. 3 is a perspective view of a tape cassette guide in a door lock apparatus according to the present invention.

Referring to FIGS. 2 and 3, a tape cassette guide 4 is installed at the lower end of insertion hole 11. Here, when a tape cassette is mounted onto holder 2 through insertion hole 11, the lower surface of the tape cassette makes contact with and slides against tape cassette guide 4. As shown in FIG. 3, tape cassette guide 4 is provided with two sloped ramps 12 and 13 which are formed by upward protrusions from the upper surface thereof and are spaced from each other by a predetermined distance. Sloped ramps 12 and 13 have inclined surfaces 12' and 13' each of which has a predetermined length, respectively. The inclination of sloped ramps 12 and 13 pitches toward the direction of cassette insertion. Here, the slopes of sloped ramps 12 and 13 should be established so that the inward rotation of door 3 is not impeded, and is determined according to the door's width. In the present embodiment, the slope is about 10° or so.

Meanwhile, tape cassette guide 4 is provided with a door locking means whereby door 3 can be opened only when a tape cassette is inserted, but not by casual manual operation.

Figure 4A:
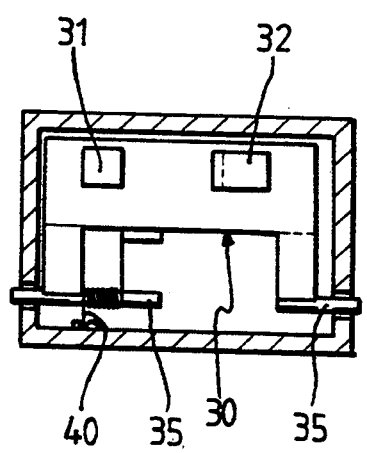
FIG. 4A is a top cross-sectional view of a door lock apparatus according to the present invention.
Figure 4B:
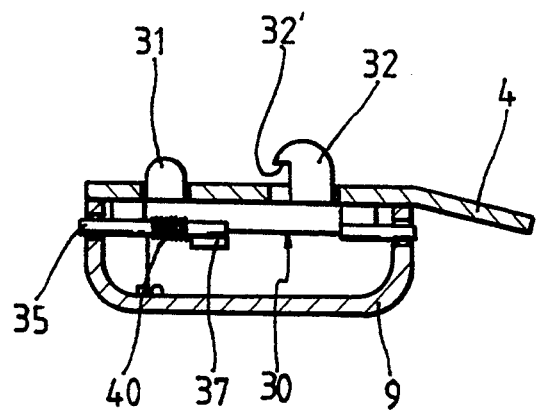
FIG. 4B is a side cross-sectional view of a door lock apparatus according to the present invention.

With reference to FIGS. 4A, 4B, 5 and 6, the constitution of the above door locking means will be described as follows. Firstly, a pair of through-holes 15 and 15' are formed on inclined surface 12', while another pair of through-holes 14 and 14' are formed on the other inclined surface 13'. As shown in FIGS. 4A and 4B, a lock 30 having an extending portion which protrudes and retracts through through-holes 14 & 14' and 15 & 15', is rotatably installed in housing 9 and located on the lower side of tape cassette guide 4. Locks 30 are installed below sloped ramps 12 and 13, respectively. FIG. 5 shows the lock which is installed at the lower side of right-hand ramp plateau 13, which has the same constitution as that of the lock which is installed at the lower side of left-hand ramp plateau 12. Lock 30 comprises a rotating shaft 35 which is rotatably supported on housing 9 located below tape cassette guide 4, a release protrusion 31 and a stopper 32 which are connected to through-holes 14 and 14' of tape cassette guide 4 so as to protrude and withdraw. The rotating shaft 35 is connected a torsion spring 40 for elastically biasing lock 30 toward tape cassette guide 4. In torsion spring 40 as shown in FIGS. 4A, 4B and 6, one end thereof is supported by housing 9, while the other end is supported by a support 37 formed in lock 30. Here, release protrusion 31 has a rounded top surface as shown in FIG.5. Stopper 32 has a neck portion 32' at which door 3 is stopped. On the other hand, the opposite surface (top and back) of neck portion 32' is rounded. Release protrusion 31 is movable within the through-hole 14' and located near door 3 when the door is closed, while stopper 32 is movable within the through-hole 14 which is farther from the closed position of door 3.

An operation of the door lock apparatus having the above constitution according to the present invention will be described below in more detail.

Since lock 30 receives the elastic force of torsion spring 40, as in FIG. 7A which shows the closed state of door 3, release protrusions 31 and 33 and stoppers 32 and 34 of lock 30 are protruded through through-holes 14 & 14' and 15 & 15'. If door 3 is manually pushed as depicted in FIG. 7B, door 3 slides over release protrusions 31 and 33 and rotates inwardly through insertion hole 11. Here, release protrusions 31 and 33 act against the elastic force of torsion spring 40 to retract via through-holes 14' and 15'. Simultaneously, stoppers 32 and 34 retract via through-holes 14 and 15. Immediately after door 3 becomes separated from release protrusions 31 and 33, both release protrusions and the stoppers 32 and 34 are returned by the stored force of torsion spring 40, as shown in FIG. 7C. Thus, the door 3 is caught by neck portions 32' and 34' of stoppers 32 and 34, so that the opening of the door cannot continue.

Figure 8D:
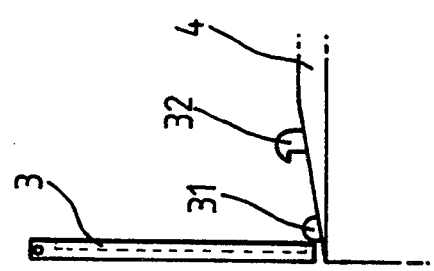
FIGS. 8A through 8D schematically show a door opening and closing operation by which the door is opened using a tape cassette.
Figure 8C:
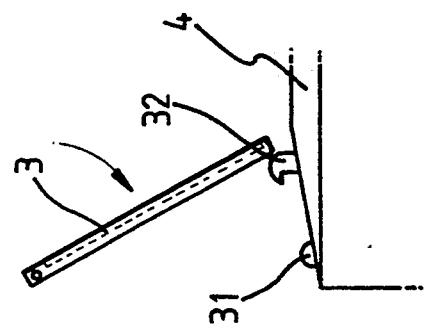
Figure 8B:
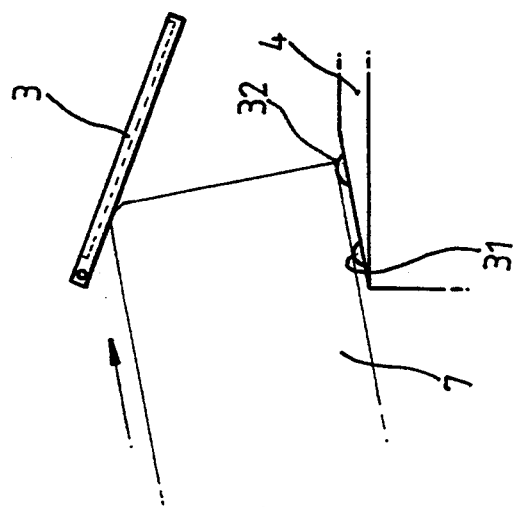
Figure 8A:
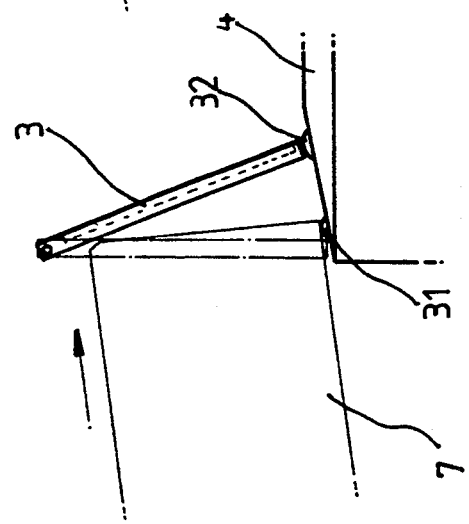

On the other hand, FIGS. 8A through 8D show the operational states of a door lock apparatus when the door is opened by inserting the tape cassette 7 into the tape recorder. As shown in FIG.8A, if tape cassette 7 makes contact with door 3 to be pushed, the lower surface of tape cassette 7 presses release protrusions 31 and 33 to retract via through-holes 14' and 15' At the same time, stoppers 32 and 34 retract via through-holes 14 and 15. At this time, stoppers 32 and 34 are beyond the boundary of the rotating radius of door 3 shown in a single dotted line. If the pushing of tape cassette 7 continues, release protrusions 31 and 33 remain pressed by the tape cassette 7. Accordingly, stoppers 32 and 34 remain withdrawn into through-holes 14 and 15, so that door 3 is opened unimpeded. Thus, tape cassette 7 pushes and opens door 3, so as to be mounted on holder 2 and loaded into the tape recorder. Further, immediately after tape cassette 7 is inserted and released from the contact with door 3, the door is rotated in a closing direction by the weight of the door itself or by the restoring force of a spring (not shown) which may be installed on a rotating shaft of the door. Here, it is sufficient if the door weight or the spring's restoring force overcomes the elastic force of torsion spring 40 which elastically biases tape cassette guide 4. That is, when door 3 is closed, the bottom edges of door 3 slide against and over stoppers 32 and 34, to push stoppers 32 and 34 partially into through-holes 14 and 15. Accordingly, door 3 can be rotated in the closing direction. Release protrusions 31 and 33 simultaneously retract into through-holes 14' and 15' by the rotational force of door 3 so as to allow the complete closing of door 3.

When tape cassette 7 is ejected by selecting an eject mode, stoppers 32 and 34 are pressed and door 3 is opened. Here, door 3 can be fully opened by the ejecting force of tape cassette 7.

On the other hand, when tape cassette 7 is ejected, door 3 can be opened by the following operation.

Figure 9:
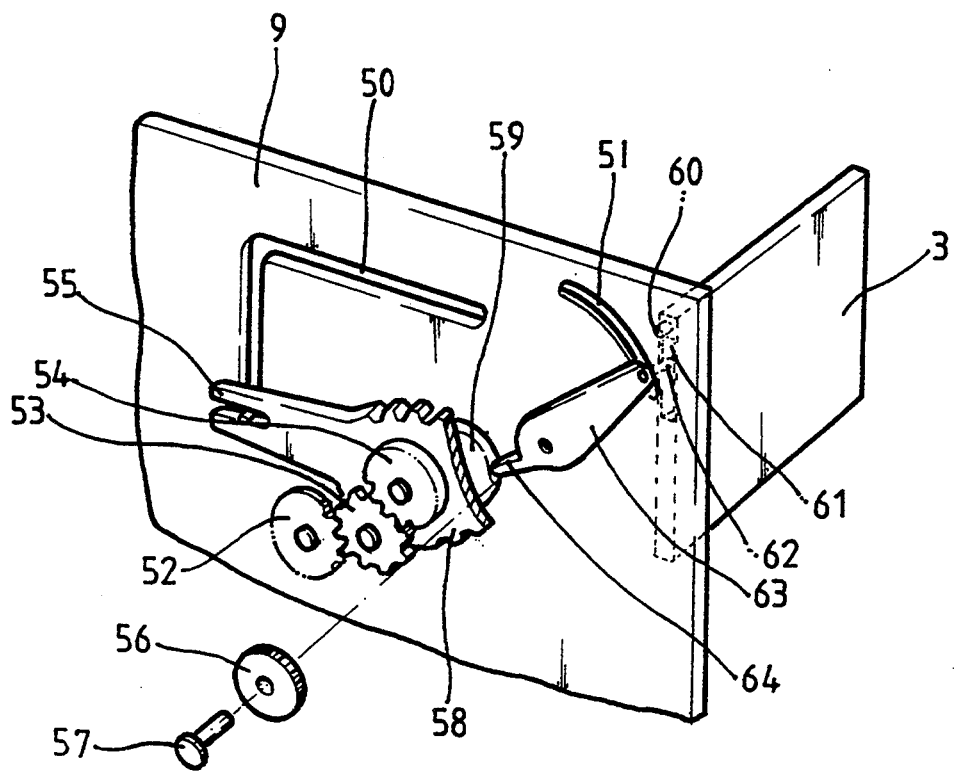
FIG. 9 is a perspective view of a door opening mechanism according to the present invention for use during a tape cassette eject mode.
Figure 10:
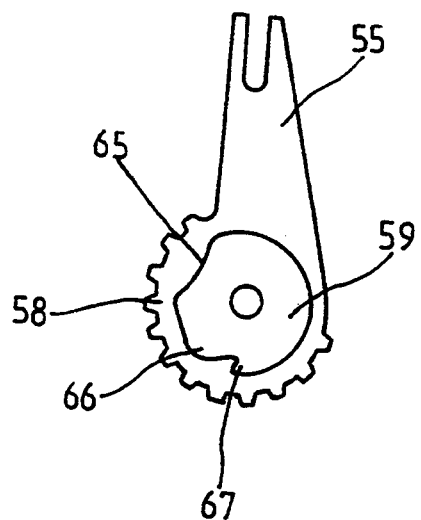
FIG. 10 is a side view of a loading arm of the door opening mechanism according to the present invention.

Referring to FIGS. 9 and 10, a loading guide 50 is formed in housing 9. A loading arm 55 is installed so as to be loaded/unloaded together with loading guide 50. A cain lock gear 58 is integrally formed with loading arm 55, so as to be engaged with gears 52, 53 and 54 and thereby driven. At the inner side of cam lock gear 58 is installed a cam 59 which is slidably moved comprising a recessed surface 65, a cain locking surface 67, and a raised surface 66. A pin 57 is installed at the rotational point of a lever 63 which is for adjusting the opening and closing operation and whose one end slides along a guide hole 51, such that a protruding rod 64 at the other end thereof is slid against the circumferential surface of cam 59 and can be operated by a levering action. Also, a driving gear 56 is engaged with cam lock gear 58.

An elongated groove 61 is formed on one side of door 3 which is rotatably connected to shaft 60. To make lever 63 slide through guide hole 51 which is formed in housing 9, guide shaft 62 is formed on the front end of lever 63 so as to protrude towards the interior of housing 9, such that the guide shaft 62 is joined with the elongated groove 61 during assembly. For the ejecting mode, loading arm 55 retreats along loading guide 50 and protruding rod 64 of lever 63 is slid along raised surface 66 between cam locking surface 67 and recessed surface 65, by the rotation of cain 59. Accordingly, raised surface 66 is rotated around shaft 57 to open door 3. Since door 3 is supported while tape cassette 7 is ejected, even if protruding rod 64 of lever 63 continues onto recessed surface 65, the door remains open. If tape cassette 7 is removed, door 3 is automatically closed by its own weight.

As described above, in the door lock apparatus for use in the tape recorder according to the present invention, when a user (e.g., a child) attempts to open door 3, the door is initially pressed against release protrusions 31 and 33, to thus allow the door to rotate inwardly. However, since door 3 is caught by neck portions 32' and 34' of stoppers 32 and 34, rotation does not proceed further. On the other hand, when tape cassette 7 is inserted, release protrusions 31 and 33 are pressed and held by the lower surface of the tape cassette. Accordingly, door 3 is not caught by neck portions 32' and 34' and is opened completely, to thus allow the insertion of tape cassette 7 into the tape recorder.

Also, since lock 30 is installed at both ends of tape cassette guide 4, even if one release protrusion 31 is pressed (e.g., manually) to open door 3, the door is caught by the other neck portion 34', so that the door still does not open.

As described above, the door lock apparatus according to the present invention permits the door to open only when the tape cassette is used. Accordingly, the inadvertent introduction of foreign matter into the interior of the tape recorder is avoided, whether it be due to consumer ignorance or a child's mischief, thereby protecting the tape recorder and decreasing maintenance costs.

It should be understood that a person skilled in the art can exercise various modifications. For example, the shapes of neck portions 32' and 34' of stoppers 32 and 34 which catch the ends of door 3, the stored force required for the rotating shaft (or the weight of door 3), as well as the relative size of torsion spring 40, can all be variously modified without departing from the spirit and scope of the present invention.

What is claimed is:

1. A door lock apparatus for use in a tape recorder in which a door is rotatably installed in an insertion hole, through which a tape cassette is inserted, so as to open and close the insertion hole, said door lock apparatus comprising:

a tape cassette guide, installed at a lower end of said insertion hole, which guides said tape cassette by slidingly contacting against a lower surface of said tape cassette; and door locking means, installed on said tape cassette guide, which blocks or releases rotation of the door when said door rotates, wherein said tape cassette guide includes first and second through-holes each having an axis, said axes of said first and second through-holes being in alignment with a direction of insertion of said tape cassette against said tape cassette guide; and further wherein said door locking means includes a release protrusion which extends through and withdraws into said first though-hole, a stopper fixed to said release protrusion below said tape cassette guide and which extends through and withdraws into said second through-hole, a rotational shaft connected to a lower side of said tape cassette guide, and a torsion spring connected to said rotational shaft for elastically biasing said release protrusion and said stopper toward said tape cassette guide, whereby said door is operative to open by the pressing of said release protrusion.

2. The door lock apparatus for use in a tape recorder according to claim 1, wherein said stopper is withdrawn into said second through-hole to a position located outside of a rotation radius of said door when said release protrusion is pressed.

3. The door lock apparatus for use in a tape recorder according to claim 1, wherein said tape cassette guide further includes a ramp which slopes upwardly with respect to a top surface of said tape cassette guide in the direction of insertion of said tape cassette, and said first and second through-holes are formed in said ramp.

* * * * *